US012724370B2

(12) United States Patent
Umeda et al.

(10) Patent No.: US 12,724,370 B2
(45) Date of Patent: Sep. 1, 2026

(54) IMAGE FORMING APPARATUS THAT PROVIDES DIFFERENT DRIVE OPERATION MODES BASED ON A SHEET SIZE

(71) Applicant: CANON KABUSHIKI KAISHA, Tokyo (JP)

(72) Inventors: Kensuke Umeda, Kanagawa (JP); Shingo Ito, Tokyo (JP); Shuichi Tetsuno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/816,560

(22) Filed: Aug. 27, 2024

(65) Prior Publication Data

US 2025/0076804 A1 Mar. 6, 2025

(30) Foreign Application Priority Data

Aug. 31, 2023 (JP) ................................ 2023-140772

(51) Int. Cl.
*G03G 15/00* (2006.01)
*G03G 15/20* (2006.01)

(52) U.S. Cl.
CPC ....... *G03G 15/5029* (2013.01); *G03G 15/205* (2013.01); *G03G 15/5008* (2013.01); *G03G 2215/00472* (2013.01); *G03G 2215/00734* (2013.01)

(58) Field of Classification Search
CPC ............ G03G 15/2046; G03G 15/205; G03G 15/2064; G03G 15/5008; G03G 15/5029; G03G 2215/00472; G03G 2215/00734
USPC .............................. 399/45, 68, 69, 127, 167
See application file for complete search history.

(56) References Cited

U.S. PATENT DOCUMENTS 6,115,563 A 9/2000 Miyamoto
6,151,462 A 11/2000 Fukuzawa et al.
6,181,890 B1 * 1/2001 Kataoka ............ G03G 15/2039 399/71

(Continued)

FOREIGN PATENT DOCUMENTS

JP 04-322284 A * 11/1992
JP H1173055 A 3/1999

(Continued)

*Primary Examiner* — Robert B Beatty
(74) *Attorney, Agent, or Firm* — ROSSI, KIMMS & McDOWELL LLP

(57) ABSTRACT

An image forming apparatus includes a photosensitive drum, a developing roller, fixing unit including a fixing film, a pressure roller, and a heating member that forms a fixing nip portion between itself and the pressure roller, and a driving source that transmits driving force to the developing roller and the pressure roller. Whether recording material is a normal-sized sheet or a small-sized sheet is determined, and in a case of the normal-sized sheet a first mode is executed in which a post-rotation operation is performed following the recording material passing the fixing nip portion, while in a case of the small-sized sheet a second mode is executed in which the post-rotation operation and processing to place in an image forming job-stop state are performed, the driving source is stopped, thereafter the driving source is driven, and thereafter the driving source is stopped.

6 Claims, 9 Drawing Sheets

(56) References Cited

U.S. PATENT DOCUMENTS

| | | | | |
|---|---|---|---|---|
| 2002/0141775 | A1* | 10/2002 | Mitsuoka | G03G 15/2042 399/69 |
| 2004/0202491 | A1* | 10/2004 | Sakai | G03G 15/2039 399/69 |
| 2008/0124143 | A1* | 5/2008 | Shinkawa | G03G 15/2028 399/327 |
| 2013/0287422 | A1* | 10/2013 | Asaka | G03G 15/2046 399/69 |

FOREIGN PATENT DOCUMENTS

| | | | |
|---|---|---|---|
| JP | H11143291 | A | 5/1999 |
| JP | 2004157242 | A | 6/2004 |
| JP | 2006154649 | A | 6/2006 |

* cited by examiner

Prior Art

FIG. 7

| | 1 TO 1000 PRINTS | 1001 TO 2000 PRINTS | 2001 TO 3000 PRINTS | 3001 TO 4000 PRINTS | 4001 TO 5000 PRINTS |
|---|---|---|---|---|---|
| COMPARATIVE EXAMPLE | O | O | O | O | O |
| CONVENTIONAL EXAMPLE | O | O | O | X | X |
| PRESENT EMBODIMENT | O | O | O | O | O |

FIG. 8

| | | PROPOR-TION 1 A4 : A5 =8 : 2 | PROPOR-TION 2 A4 : A5 =6 : 4 | PROPOR-TION 3 A4 : A5 =4 : 6 |
|---|---|---|---|---|
| CONVENTIONAL EXAMPLE | IMAGE EVALUATION | ○ | × | × |
| | JOB NON-EXECUTABLE TIME (sec) | 10000 | 20000 | 30000 |
| PRESENT EMBODIMENT | IMAGE EVALUATION | ○ | ○ | ○ |
| | JOB NON-EXECUTABLE TIME (sec) | 10000 | 24000 | 36000 |
| COMPARATIVE EXAMPLE 2 | IMAGE EVALUATION | ○ | ○ | ○ |
| | JOB NON-EXECUTABLE TIME (sec) | 12000 | 24000 | 36000 |

Low

Mid

Full

IMAGE FORMING APPARATUS THAT PROVIDES DIFFERENT DRIVE OPERATION MODES BASED ON A SHEET SIZE

BACKGROUND OF THE INVENTION

Field of the Invention

The present invention relates to an image forming apparatus.

Description of the Related Art

An image forming apparatus, such as a photocopier, a printer, a facsimile apparatus, and so forth, is known, which forms an image on recording material using an electrophotography system or an electrostatic recording system. In image forming operations in such an image forming apparatus, an electrostatic latent image is formed on an image bearing member, and a developing apparatus supplies toner to the electrostatic latent image and forms a toner image. There are cases in which such a developing apparatus is configured so as to be detachable from and attachable to an apparatus main unit of the image forming apparatus, singularly as an independent unit, or as part of a process cartridge.

The developing apparatus typically has a developer container that accommodates toner, and a developing roller that is disposed in an opening portion of the developing container and that transports toner to outside of the developing container by rotating while bearing toner. The developing apparatus also has a supply roller that supplies toner to the developing roller, and a developing blade that regulates the amount of toner borne by the developing roller.

The image forming apparatus also has a fixing apparatus that fixes toner images transferred onto the recording material. The fixing apparatus typically is provided with a pressure roller that is cylindrical or columnal in shape and that is rotatable, a fixing film, and heating means having a heat-generating face, and configured such that the fixing film is supported so as to be slidable on the heat-generating face. Heating fixation is performed at a fixing nip portion between the fixing film and the pressure roller. In such a film-type fixing apparatus, the temperature of the fixing nip portion rises in a short time upon heat being supplied from heating means, due to the fixing film having low thermal capacity. Accordingly, a timing of applying electricity to the heating means is set to be approximately the same time as the recording material that bears an unfixed image entering the fixing nip portion. This is how conservation of energy consumption of the heating means and so forth, and prevention of excessive rise in temperature within the image forming apparatus, have been carried out.

Also, in such a fixing apparatus, post-rotation of the pressure roller may be performed after the recording material that is the object of fixation passes the fixing nip portion, in order to lower the temperature at an end portion of the pressure roller and so forth. The time of post-rotation of the pressure roller in the fixing apparatus is often set so conform to normal sheet sizes (e.g., recording material of letter (LTR) size or A4 size). Meanwhile, there are cases in which image forming apparatuses perform printing on shall-sized sheets (e.g., recording material with a smaller width than normal size sheets, such as envelopes, postcards, and so forth). Now, there are cases in which problems arise in temperature management when post-rotation is performed for small-sized sheets under similar time settings as with normal-sized sheets. That is to say, when defining a region of a sheet-passage region of the fixing nip portion where small-size sheets pass as a "first region" and a region excluding the first region from the entirety of the sheet-passage region as a "second region", the second region does not come into contact with the recording material, and accordingly does not have heat drawn away therefrom by the recording material. Thus, the temperature in the second region is not sufficiently lowered by post-rotation, and the temperature therein is higher as compared to the temperature of the first region.

Thus, when fixation processing is performed on normal-sized sheets in such a state in which there is a temperature difference between a middle portion and end portions of the fixing nip following fixation processing on small-sized sheets, the next fixation processing will be performed before surface temperature distribution of the pressure roller returns to a stipulated state. As a result, supply of heat is excessive in the second region of the fixing nip portion in particular, which may lead to defective images. An example of a defective image is high-temperature offset, in which unfixed toner is transferred from a surface of a normal-sized sheet to an outer peripheral surface of the fixing film.

Accordingly, Japanese Patent Application Publication No. 11-073055 discloses a configuration in which the time of post-rotation is extended for cases of small-sized sheets as compared to cases of normal-sized sheets, so as to perform temperature suppression of high-temperature portions.

SUMMARY OF THE INVENTION

In recent years, for reduced size of monochrome image forming apparatuses in particular, a configuration has come to be employed that has a drive source commonly used between the fixing apparatus and the developing roller, and that do not have a developing roller drive disengaging mechanism. With such an image forming apparatus, rotation that is not necessary for the developing roller will be continued until driving of the fixing apparatus ends. In this configuration, when the control for extended post-rotation to suppress temperature of the fixing apparatus is performed for the case of small-sized sheets being passed, as described in Japanese Patent Application Publication No. 11-073055, the number of rotations of the developing roller will increase even further as compared to that of normal-sized sheets. Increase in the number of rotations of the developing roller causes repeated rubbing of toner in the developing apparatus by the supply roller and the developing blade. This rubbing may cause deterioration in the toner, due to freeing or embedding (burying) of external additives, which are added to the toner, with respect to resin particles serving as the base of the toner. Advanced deterioration of the toner may lead to a situation in which the toner cannot exhibit desired functions, due to causes such as charge quantity of toner deteriorating and desired amount of charge not being obtained, and so forth. This may cause image defects such as, for example, so-called fogging, in which toner adheres to white background portions of the recording material, and so forth.

The present invention has been made in light of the above-described problems. It is an object of the present invention to suppress image defects due to toner deterioration in an image forming apparatus having a configuration in which a drive source is commonly used between the fixing apparatus and the developing roller, and connection of the developing roller and the drive source is not disengaged, and also that is capable of image formation on normal-sized sheets and small-sized sheets.

The present invention provides an image forming apparatus, comprising:

a photosensitive drum on which an electrostatic latent image is formed on a surface thereof in accordance with image information;

a developing roller configured to supply toner to the photosensitive drum to develop the electrostatic latent image and form a toner image;

transfer unit for transferring the toner image onto a recording material;

fixing unit for performing heating fixing of the toner image onto the recording material, the fixing unit including a pressure roller and a heating member that forms a fixing nip portion between the heating member and the pressure roller;

a driving source for transmitting driving force to the developing roller and the pressure roller; and a control unit, wherein the control unit is configured to determine whether the recording material is a normal-sized sheet of which a width in an intersecting direction is a at least a predetermined distance, or a small-sized sheet of which the width is smaller than the predetermined distance, execute, in a case in which the recording material is the normal-sized sheet, a first mode, in which a post-rotation operation is performed in which the driving source is driven for a predetermined amount of time following the recording material passing the fixing nip portion, and execute, in a case in which the recording material is the small-sized sheet, a second mode is executed, in which the post-rotation operation is executed following the recording material passing the fixing nip portion, and also in an image forming job-stop state in which an image forming operation is not executed, first stopping of stopping the driving source, first driving of driving the driving source following the first stopping, and second stopping of stopping the driving source following the first driving, are performed.

According to the present invention, image defects due to toner deterioration can be suppressed in an image forming apparatus having a configuration in which a drive source is commonly used between the fixing apparatus and the developing roller, and connection of the developing roller and the drive source is not disengaged, and that is capable of image formation on normal-sized sheets and small-sized sheets.

Further features of the present invention will become apparent from the following description of exemplary embodiments with reference to the attached drawings.

BRIEF DESCRIPTION OF THE DRAWINGS

FIG. 7 is a diagram showing image evaluation results for the first embodiment;

FIG. 8 is a diagram showing image evaluation results and time measurement results according to a second embodiment.

DESCRIPTION OF THE EMBODIMENTS

An image forming apparatus according to the present invention will be described in further detail below with reference to the drawings. Note that dimensions, materials, shapes, relative placements thereof, and so forth, of components described in the embodiments below, should be changed as appropriate in accordance with configurations of apparatuses to which the present invention is applied and various types of conditions, and are not intended to limit the scope of the present invention to the embodiments described below. Technology known to the related field, or widely-known technology, can be applied to configurations and processes that are not illustrated or described in particular. Also, repetitive description may be omitted.

First Embodiment

Overall Configuration of Image Forming Apparatus

Figure 1:
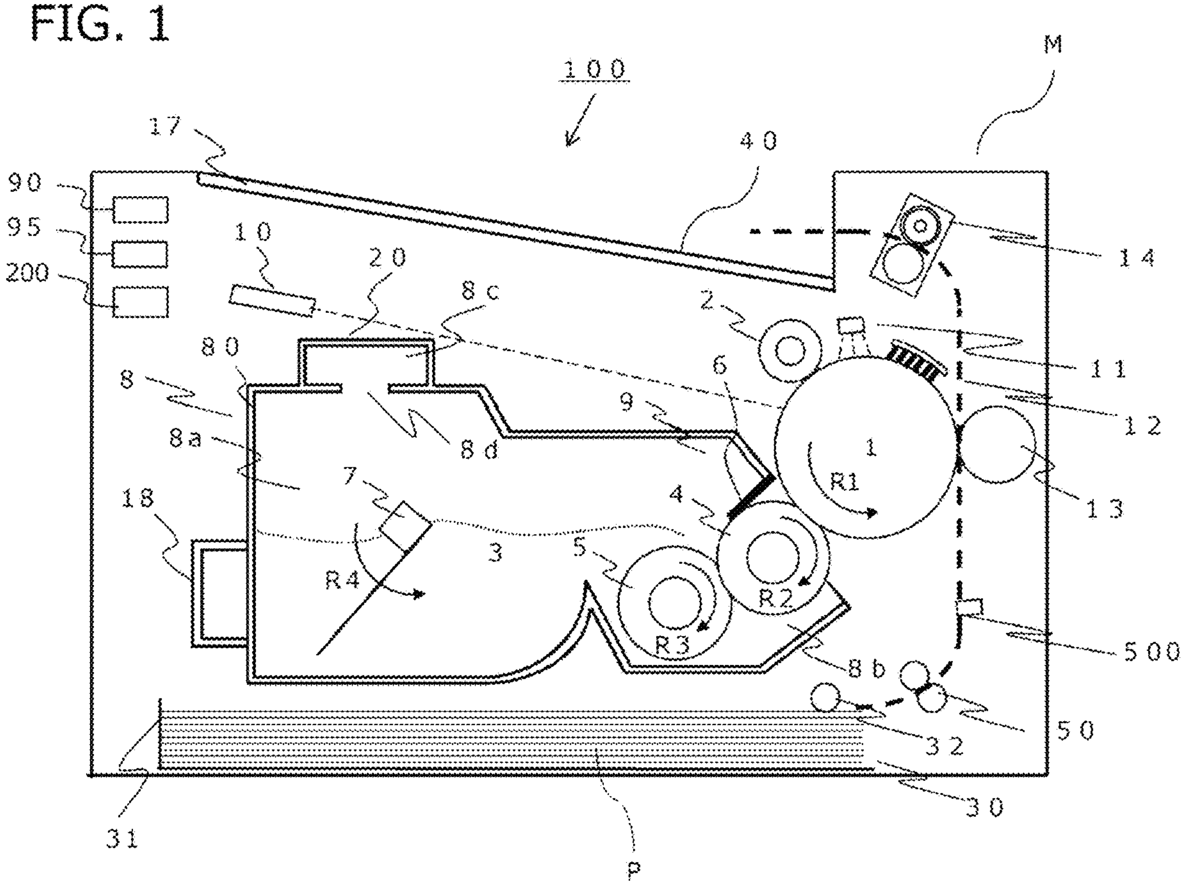
FIG. 1 is a schematic diagram of an overall configuration of an image forming apparatus according to the present invention.

First, a schematic configuration of an image forming apparatus according to a first embodiment will be described. FIG. 1 is a schematic cross-sectional view of an image forming apparatus 100 according to the present embodiment. The image forming apparatus 100 according to the present embodiment is a monochrome laser printer that is capable of forming black unicolor images on sheet-like recording material P by an electrophotography system. A process cartridge 9 is configured to be detachably attachable to an apparatus main unit M of the image forming apparatus 100. Note that the apparatus main unit M is a configuration portion of the image forming apparatus 100 from which the process cartridge 9 is excluded.

Note that image forming apparatuses to which the present invention is applicable are not limited to this. The present invention is also applicable to a color laser printer that has a plurality of process cartridges 9 in a detachably attachable manner, and transfers toner images of a plurality of colors onto the recording material P using an intermediate transfer member such as an intermediate transfer belt or the like, so as to form full-color images, for example. Also, while the image forming apparatus 100 has a configuration in which the process cartridge 9 is detachably attachable in the present embodiment, the present invention is also applicable to an image forming apparatus in which a process unit having same components as the process cartridge 9 is provided in the apparatus main unit.

The process cartridge 9 has a photosensitive drum 1 that is a drum-type (cylindrical) photosensitive member (electrophotographic photosensitive member) that is rotatable and that serves as an image-bearing member. Also, the process cartridge 9 has a charging roller 2 that is a roller-type charging member serving as charging means, and a developing apparatus 8 serving as developing means, disposed around the photosensitive drum 1. The process cartridge 9 also has a brush member 12 serving as a paper dust recovery member, and a static electricity removing device 11 serving as static electricity removing means, disposed around the photosensitive drum 1. The process cartridge 9 also has memory 15 serving as nonvolatile storage means. Further, the process cartridge 9 has a toner amount sensor 20 serving as developer amount sensing means. The charging roller 2, a developing roller 4 serving as a developer bearing member that is provided to the developing apparatus 8, and the brush member 12, are disposed in contact with a surface (outer peripheral face) of the photosensitive drum 1. The process cartridge 9 is configured to be easily attached to and detached from the apparatus main unit M in an integral manner, through attaching means (omitted from illustration) such as attaching guides, positioning members, and so forth, provided to the apparatus main unit M and the process cartridge 9.

The image forming apparatus 100 also has a transfer roller 13 that is a roller-type transfer member, serving as transfer means, an exposing apparatus 10 serving as exposing means, and a fixing apparatus 14 serving as fixing means. The transfer roller 13 is disposed in contact with the surface of the photosensitive drum 1.

Figure 2:
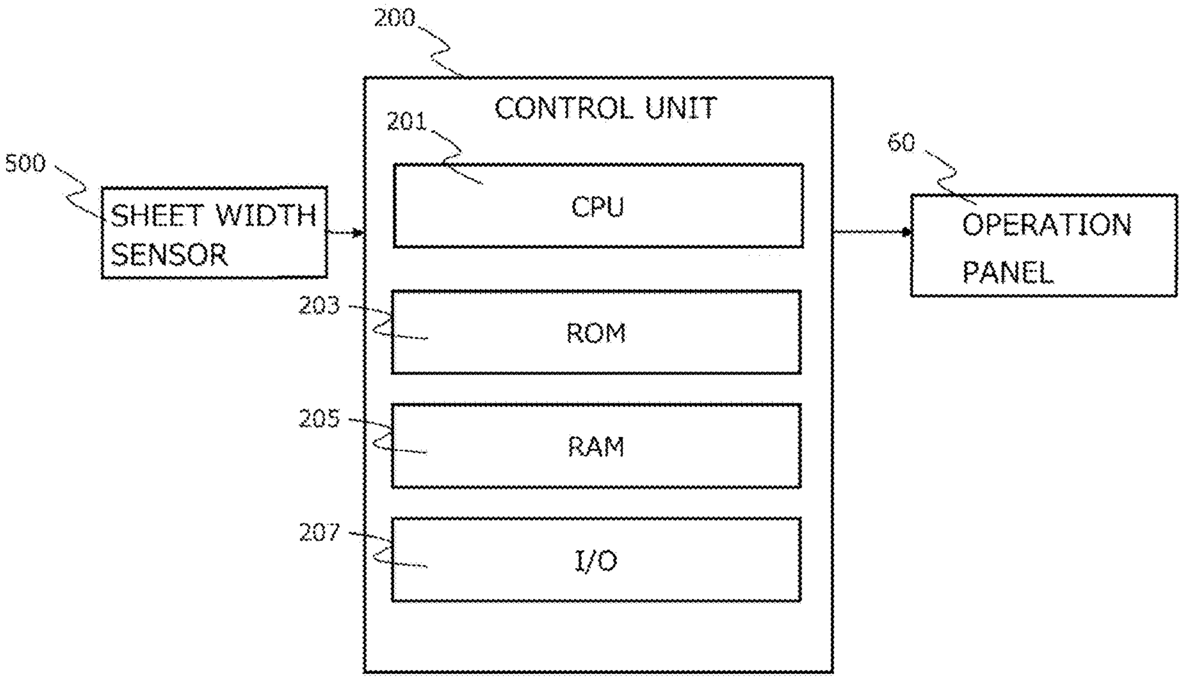
FIG. 2 is a block diagram illustrating a control system of the image forming apparatus according to the present invention.

Further, the image forming apparatus 100 has a control unit 200 that controls the entire image forming apparatus 100, an operation panel 60 serving as an operating unit, and so forth, as illustrated in FIG. 2. The operation panel 60 is configured having a display unit for displaying information for an operator such as a user, service staff, or the like, under control by the control unit 200, an input unit for inputting information to the control unit 200 in accordance with operations performed by the operator, and so forth. The control unit 200 includes a CPU 201 that performs computation following programs, and serves as a control circuit for controlling various components, ROM 203 that saves programs and the like, RAM 205 used for loading programs and so forth, an I/O 207 for performing communication with external devices and so forth, and the like. The ROM 203 and the RAM 205 are recording means, for which existing memory and so forth can be used.

Image Forming Operations

Next, image forming operations of the image forming apparatus 100 according to the present embodiment will be described. Driving force from a driving motor 90 serving as a driving source making up driving means provided to the apparatus main unit M is transmitted to the photosensitive drum 1, which is rotationally driven in an arrow R1 direction in FIG. 1 (counterclockwise direction in FIG. 1) at a predetermined process speed. Note that the process speed here corresponds to the peripheral speed (surface travel speed) of the photosensitive drum 1. The process speed in the present embodiment is 140 mm/sec.

The charging roller 2 comes into contact with the surface of the photosensitive drum 1 at a predetermined contact pressure, thereby forming a charging portion. A predetermined charging voltage (charging bias), which is direct current voltage from a charging voltage applying circuit serving as charging voltage applying means provided to the apparatus main unit M is applied to the charging roller 2. Accordingly, the charging roller 2 performs charging processing in which the surface of the photosensitive drum 1 is uniformly subjected to charging processing to a predetermined potential of a predetermined polarity (negative polarity in the present embodiment). In the present embodiment, charging voltage of −1400 V is applied to the charging roller 2 such that surface potential (pre-exposure potential VD) of the photosensitive drum 1 will be −800 V. Note that while direct current voltage is used as the charging voltage in the present embodiment, this is not restrictive, and oscillating voltage in which direct current voltage and alternating current voltage are superimposed may be used as the charging voltage. A power supply 95 of the image forming apparatus 100 is a high-voltage power supply for supplying voltage at the time for performing various operations, including image forming operations, and functions as various types of voltage applying means.

The surface of the photosensitive drum 1 that has been uniformly subjected to charging processing is scanned and exposed by the exposing apparatus 10, by irradiation of a laser beam on the basis of image information, thereby forming an electrostatic latent image on the photosensitive drum 1. In the present embodiment, the exposing apparatus 10 is made up of a scanner unit. Image information that is input to the image forming apparatus 100 from an external device (omitted from illustration) such as a personal computer or the like connected to the image forming apparatus 100 is converted into time-sequence electrical digital image signals by a video controller (omitted from illustration) that the image forming apparatus 100 is provided with. The exposing apparatus 10 is controlled by the control unit 200 to emit a laser beam that has been modulated in accordance with the time-sequence electrical digital image signals, and scans and exposes the surface of the photosensitive drum 1. Accordingly, the electrostatic latent image corresponding to the image information is formed on the photosensitive drum 1. In the present embodiment, the surface of the photosensitive drum 1 is irradiated by a laser beam having intensity of 0.45 $\mu J/cm^2$, by the exposing apparatus 10, such that post-exposure potential VL of the surface of the photosensitive drum 1 becomes −100 V.

The electrostatic latent image formed on the photosensitive drum 1 is then developed (visualized) by toner 3 serving as developer being supplied from the developing apparatus 8. Accordingly, a toner image (developer image) is formed on the photosensitive drum 1. The developing apparatus 8 has the developing roller 4 serving as the developer bearing member. The developing roller 4 forms the developing portion by coming into contact with the surface of the photosensitive drum 1 at a predetermined contact pressure. A toner layer of the toner 3, charged to a predetermined polarity (negative polarity in the present embodiment), is formed on the developing roller 4. A predetermined developing voltage (developing bias) that is direct current voltage from a developing charging voltage applying circuit serving as developing charging voltage applying means provided to the apparatus main unit M is applied to the developing roller 4. Accordingly, the toner 3 adheres to the electrostatic latent image on the photosensitive drum 1 at the developing portion. The toner image is thus formed on the photosensitive drum 1. In the present embodiment, developing voltage of −400 V is applied to the developing roller 4. In the present embodiment, the toner 3 charged to the same polarity as the charging polarity of the photosensitive drum 1 (negative polarity in the present embodiment) adheres to the exposed portion (image portion) on the photosensitive drum 1 where the absolute value of potential has decreased by being exposed following being uniformly subjected to charging processing (reversal developing system). In the present embodiment, the regular charging polarity of the toner 3, which is the primary charging polarity of the toner 3 when developing, is negative polarity.

The transfer roller 13 forms a transfer portion by coming into contact with the photosensitive drum 1 at a predetermined contact pressure. The toner image formed on the photosensitive drum 1 is transferred onto the recording material P transported by being clamped between the photosensitive drum 1 and the transfer roller 13 at the transfer portion. At the time of transfer, a predetermined transfer voltage (transfer bias) that is direct current voltage is applied from a transfer voltage applying circuit serving as transfer voltage applying means to the transfer roller 13. In the present embodiment, transfer voltage of +1500 V is applied to the transfer roller 13.

The recording material (transfer material, recording medium, sheet) P is supplied from a sheet feed unit 30 to the transfer unit. The sheet feed unit 30 is made up of a cassette 31 serving as a recording material accommodating unit, a sheet feed roller 32 serving as a sheet feed member, and so forth. The recording material P accommodated in the cassette 31 is separated one sheet at a time by the sheet feed roller 32 and fed out from the cassette 31. This recording material P is transported to the transfer portion by a transport roller (registration roller) 50 serving as a transporting member, such that the timing matches that of the toner image on the photosensitive drum 1.

The recording material P onto which the toner image is transferred is transported to the fixing apparatus 14 serving as fixing means. The fixing apparatus 14 applies heat and pressure to the recording material P, thereby fixing (fusing, fixing) the toner image on the recording material P. The recording material P onto which the toner image has been fixed is discharged (output) to a tray 40 serving as a discharge portion provided outside of the apparatus main unit M.

Meanwhile, the toner 3 (transfer residual toner) remaining on the photosensitive drum 1 without being transferred onto the recording material P in the transfer process is removed from the photosensitive drum 1 as follows. The surface of the photosensitive drum 1 following the transfer process is subjected to static electricity removal by the static electricity removing device (static electricity removing lamp) 11 such that the surface potential thereof is 0 V, and thereafter enters the charging portion. Toner 3 that is charged to positive polarity, and toner 3 that is charged to negative polarity but does not have sufficient charge, coexist in the transfer residual toner remaining on the photosensitive drum 1. Such transfer residual toner is charged to negative polarity by discharge at the charting portion. The transfer residual toner that is charged to negative polarity at the charging portion reaches the developing portion in conjunction with rotation of the photosensitive drum 1. Now, the electrostatic latent image corresponding to the image information is formed on the surface of the photosensitive drum 1 arriving at the developing portion. The transfer residual toner adhering to non-exposed portions (non-image portions) on the photosensitive drum 1 relocates from the photosensitive drum 1 to the developing roller 4 due to potential difference between the pre-exposure potential VD on the photosensitive drum 1 and the developing voltage at the developing portion, and is recovered to a developing chamber *8b* of the developing apparatus 8. Note that the toner 3 that is recovered to the developing chamber *8b* is used in image forming again. Meanwhile, the transfer residual toner adhering to the exposed portions (image portions) on the photosensitive drum 1 does not relocate from the photosensitive drum 1 to the developing roller 4 at the developing portion, and makes up the toner image along with the toner 3 that has been relocated from the developing roller 4 to the photosensitive drum 1. This toner 3 is then transferred onto the recording material P at the transfer portion, and thus is removed from upon the photosensitive drum 1.

The process cartridge 9 is also provided with the brush member 12. The brush member 12 is the paper dust recovery member for removing paper dust fibers generated from the recording material P that have become adhered to the photosensitive drum 1 from the recording material P during the transfer process. The brush member 12 is disposed so as to be in contact with the photosensitive drum 1 on a downstream side of the transfer portion in a rotational direction of the photosensitive drum 1, and also on an upstream side of the charging portion. The brush member 12 picks up the paper dust fibers on the photosensitive drum 1 by rubbing the surface of the photosensitive drum 1 in conjunction with the rotation of the photosensitive drum 1, thereby removing the paper dust fibers from upon the photosensitive drum 1.

In the present embodiment, the single driving motor 90 serves as the driving source, to reduce the size of the image forming apparatus. The photosensitive drum 1, the developing roller 4, and the fixing apparatus 14 are all connected by a geartrain, and operate being driven by this driving motor 90. This is a configuration in which there is no mechanism for separating the developing roller 4 from the driving motor 90. Having no need for space for such separation also reduces the size of the image forming apparatus.

Detailed Configuration of Developing Apparatus

Next, a detailed configuration of the developing apparatus 8 in the image forming apparatus 100 according to the present embodiment will be described.

Developing Apparatus

In the present embodiment, the developing apparatus 8 is a single-component contact developing apparatus that uses a non-magnetic single-component developer (toner 3) as the developer. The developing apparatus 8 has a developer container 80 (frame body) that is made up of the developing chamber *8b* serving as a developing member accommodation chamber, and a toner accommodation chamber *8a* serving as a developer accommodation chamber. The developing chamber *8b* and the toner accommodation chamber *8a* communicate via an opening portion. The developing chamber *8b* is provided with the developing roller 4 serving as the developer bearing member (developing member), a supply roller 5 serving as a supply member for supplying the toner 3 to the developing roller 4, and a developing blade 6 serving as a regulating member for regulating the amount of the toner 3 on the developing roller 4 while applying charge of a predetermined polarity to the toner 3 on the developing roller 4.

The developing roller 4 is rotatably disposed at an opening portion of the developing chamber *8b* (developer container 80), and transports the toner 3 from inside of the developing chamber *8b* (developer container 80) to the outside by rotating while bearing the toner 3. The toner 3 serving as the developer is accommodated in the toner accommodation chamber *8a*. Also, a stirring member 7 for transporting the toner 3 from the toner accommodation chamber *8a* to the developing chamber *8b* while stirring the toner 3 in the toner accommodation chamber *8a* is provided in the toner accommodation chamber *8a*.

Note that while the developing apparatus 8 employs the contact development system in which the image bearing member and the developer bearing member are disposed in contact in the present embodiment, this is not restrictive. The developing apparatus 8 may employ a two-component developing system that uses two-component developer, and may employ a non-contact development system in which the image bearing member and the developer bearing member are disposed facing each other across a predetermined gap.

In the present embodiment, the developing roller 4 is made by coating, on an outer perimeter of a metal core that is 6 mm in diameter, a base layer of silicone rubber, and a surface layer of urethane rubber, in this order, such that the outer diameter is 15 mm. Also, in the preset embodiment, an electric resistance value of the developing roller 4 is $1\times10^4$ to $1\times10^{12}\Omega$.

Also, in the present embodiment, the supply roller 5 is an elastic sponger roller that has conductivity, and that is made by forming a foamed substance layer on an outer perimeter of a metal core that is 6 mm in diameter. Also, in the present embodiment, an electric resistance value of the supply roller 5 is $1\times10^4$ to $1\times10^8\Omega$, and hardness is 200 gf. Note that the hardness of the supply roller 5 is a value in which a load is measured in a case of intrusion of a flat plate 50 mm in longitudinal length by 1 mm from the surface of the supply roller 5.

In the present embodiment, the developing blade 6 is a stainless steel flat plate 0.1 mm thick, that has a predetermined length in a longitudinal direction and in a transverse direction substantially orthogonal to the longitudinal direction, and that is disposed following a rotational axis direction of the developing roller 4. This developing blade 6 is disposed with a free end in the transverse direction facing toward the upstream side in the rotational direction of the developing roller 4, and with a side face thereof near the free end in contact with the developing roller 4 following the longitudinal direction. In the present embodiment, an article obtained by cutting a distal end (free end) of a stainless steel plate from a side of the face that comes into contact with the developing roller 4 was used for the developing blade 6. The distal end portion of the developing blade 6 is curved in a cutting direction by the cutting, and the amount of curving of the distal end of the developing blade 6 that is equivalent to a curvature radius R is 0.02 mm.

Movement of the toner 3 in the developing apparatus 8 while driving will be described. Driving force is transmitted to the developing apparatus 8 from the driving motor 90 serving as the driving source making up driving means provided to the apparatus main unit M. Accordingly, the developing roller 4, the supply roller 5, and the stirring member 7 each rotate in an arrow R2 direction (clockwise direction), an arrow R3 direction (clockwise direction), and an arrow R4 direction (counterclockwise direction) in FIG. 1. Note that the driving source of the photosensitive drum 1 and the rotating members of the developing apparatus 8 (developing roller 4, supply roller 5, and stirring member 7) may be in common.

Due to the stirring member 7 within the toner accommodation chamber 8*a* rotating, the toner 3 in the toner accommodation chamber 8*a* is stirred and is also transported toward the supply roller 5 in developing chamber 8*b*. The toner 3 held by the foamed substance layer of the supply roller 5 is fed to a contact portion with the developing roller 4 by rotation of the supply roller 5. The toner 3 that reaches this contact portion is then rubbed by the contact portion of the surface of the developing roller 4 and the surface of the supply roller 5 which move in opposite directions from each other, and part thereof adheres to the surface of the developing roller 4.

The toner 3 adhering to the surface of the developing roller 4 is fed to the contact portion with the developing blade 6, in conjunction with rotation of the developing roller 4. The developing blade 6 restricts the amount of the toner 3 adhering to the surface of the developing roller 4 to form a uniform thin layer, and also performs triboelectric charging of the toner 3. The toner 3 that is formed into the thin layer is fed to the contact portion with the photosensitive drum 1 in conjunction with rotation of the developing roller 4, and is used for developing the electrostatic latent image formed on the photosensitive drum 1. The toner 3 remaining on the surface of the developing roller 4 without being used for developing is transported to the contact portion with the supply roller 5, and is removed from the surface of the developing roller 4 by the supply roller 5. The removed toner 3 is fed to inside of the toner accommodation chamber 8*a*, and is stirred and mixed with the toner 3 inside of the toner accommodation chamber 8*a*.

Detailed Configuration of Fixing Apparatus

The fixing apparatus 14 will be described with reference to the cross-sectional view in FIG. 3A and the side view in FIG. 3B. The fixing apparatus 14 according to the present embodiment is configured such that a heating heater 113 is held by a heater holder 130, and a fixing film 112 is provided on a perimeter thereof, as a heating member that is in the form of an endless belt. The heater holder 130 is preferably made of a thermally insulating material, such that heat of the heating heater 113 is not readily drawn away. In the present embodiment a liquid crystal polymer (LCP) that is a heat-resistant resin was used. The heater holder 130 is supported from the side opposite to the heating heater 113 by a stay 120 that is made of metal, for the sake of strength. The stay 120 is pressed from both end portions thereof in the longitudinal direction, by a pressure spring that is omitted from illustration.

Figure 3A:
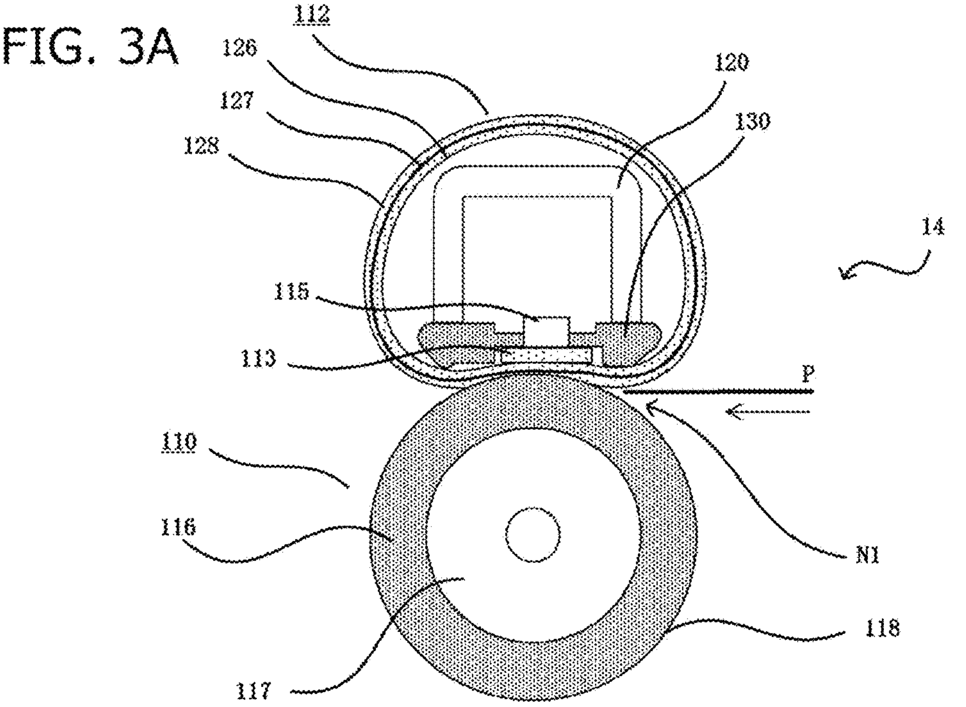
FIGS. 3A and 3B are schematic diagrams of a fixing apparatus according to the present invention.

As illustrated in FIG. 3A, the heating heater 113 comes into contact with an inner face of the fixing film 112 to form an inner-face nip, and heats the fixing film 112 from the inner side. A pressure roller 110 faces the heating heater 113 with the fixing film 112 interposed therebetween, thereby forming a fixing nip. The pressure roller 110 receives force of pressure springs by bearings that are omitted from illustration, provided at both end portions of a metal core 117 thereof, and is driven by receiving driving force at a driving gear 131 provided on the end portion of the metal core 117, from the driving source. When the pressure roller 110 is driven, the fixing film 112 rotates being driven under motive force from the pressure roller 110 at the fixing nip.

Figure 3B:
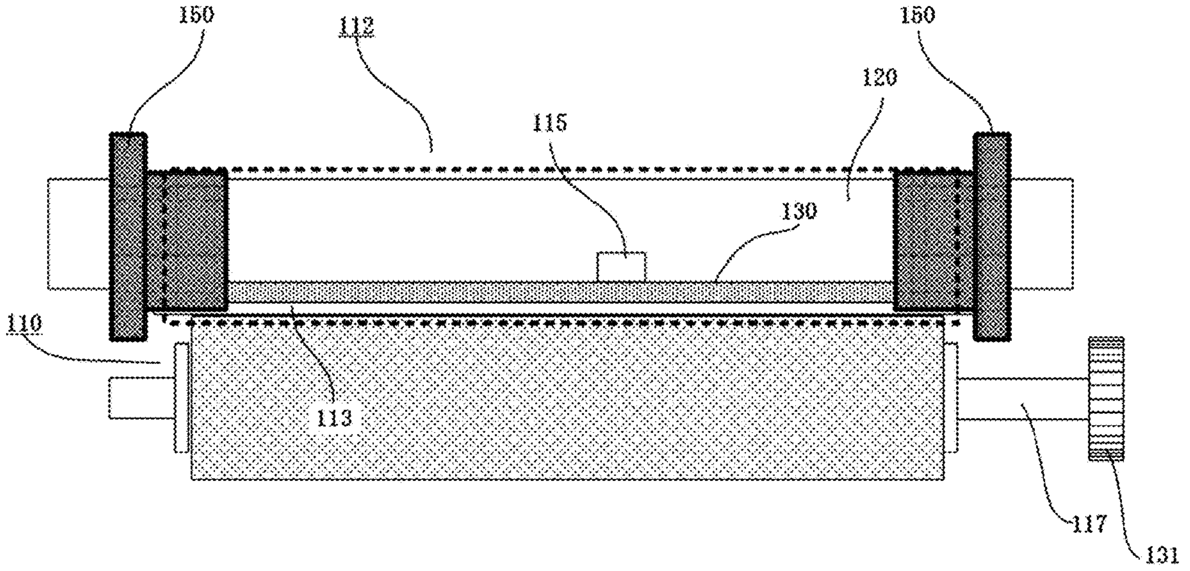

Fixing flanges 150 are provided on both end portions of the fixing film 112 for restricting deviation as illustrated in FIG. 3B, to keep the fixing film 112 from deviating to the right or to the left in the longitudinal direction. The fixing flanges 150 are disposed and fixed by being fit to the stay 120. Rotation of the fixing film 112 is supported from the inner face thereof by the fixing flanges 150 at both end portions thereof.

In a state of not being deformed, the fixing film 112 according to the present embodiment has an outer diameter of 20 mm when in a cylindrical state, and has a multi-layer configuration in a thickness direction. The makeup of the layered configuration of the fixing film 112 is a base layer 126 to maintain strength of the film, and a release layer 128 to reduce soiling adhesion to a surface thereof. For the material of the base layer 126, a metal such as stainless steel, nickel, or the like, or a heat-resistant resin such as polyimide or the like, is preferably used, since heat resistance is necessary due to being subjected to heat from the heating heater 113, and also strength is necessary due to sliding over the heating heater 113. Metal has strength as compared to resin and accordingly can be formed thin, and also thermal conductivity is high, and accordingly heat from the heating heater 113 is readily conducted to the surface of the fixing film 112. Conversely, resin is advantageous in that thermal capacity is small due to the specific gravity thereof being small, and heating is quicker. Also, molding of resin can be performed inexpensively, since a thin film can be molded by coating molding. In the present embodiment, polyimide resin was used as the material for the base layer 126 of the fixing film 112, and a carbon-based filler was added in order to improve thermal conductivity and strength. The thinner the base layer 126 is, the faster the heat of the heating heater 113 reaches the surface of the fixing film 112, but strength deteriorates, and accordingly the thickness is preferably around 15 μm to 100 μm. In the present embodiment, the thickness was 60 μm.

A conductive primer layer 127 is made of polyimide resin or fluororesin, with carbon or the like having been added to lower resistance. Potential of the fixing film 112 is stabilized at the time of sheet passage by grounding a conducting layer exposure portion.

The material used for the release layer 128 preferably is a fluororesin such as perfluoroalkoxy alkane (PFA) resin, polytetrafluoroethylene (PTFE) resin, tetrafluoroethylene-hexafluoropropylene (FEP) resin, or the like. In the present embodiment, PFA that has excellent releasability and heat resistance among fluororesins is used, in which a conductive material is dispersed to achieve mid-level resistance. The release layer 128 may be formed by covering with a tube, or may be obtained by coating a surface thereof with a coating material. In the present embodiment, the release layer 128 was molded by coating molding that has excellent thin molding capabilities. The thinner the release layer 128 is, the more readily the heat of the heating heater 113 is conveyed to the surface of the fixing film 112, but durability deteriorates if too thin, and accordingly 5 μm to 30 μm is preferable, and was set to 10 μm in the present embodiment.

The outer diameter of the pressure roller 110 according to the present embodiment is 14 mm, with silicone rubber being disposed to a thickness of 2.5 mm on an outer diameter 9 mm portion of the metal core 117 made of iron, thereby forming an elastic layer 116.

Silicone rubber and fluoro-rubber that are heat resistant are used for the elastic layer 116, and silicone rubber is used in the present embodiment. An article that is around 10 to 50 mm in outer diameter is used for the pressure roller 110. The smaller the outer diameter is, the more the thermal capacity can be suppressed, but if too small, the width of the fixing nip becomes narrow, and accordingly an appropriate diameter is necessary. In the present embodiment, the outer diameter was set to 14 mm. An appropriate thickness is also necessary for the thickness of the elastic layer 116, since if too thin, the heat will be drawn to the core that is made of metal. In the present embodiment, the thickness of the elastic layer 116 was set to 2.5 mm.

A release layer 118 made of perfluoroalkoxy alkane (PFA) resin is formed on the elastic layer 116 as a release layer for the toner 3. The release layer 118 may be formed by covering with a tube, or may be obtained by coating the surface thereof with a coating material, in the same way as with the release layer 128 for the fixing film 112, but a tube that is 20 μm thick was used in the present embodiment, for excellent durability. Besides PFA, fluororesins such as PTFE, FEP, or the like may be used, or fluoro-rubber, silicone rubber, or the like, which have good release properties, may be used as the material for the release layer 118. The lower the surface hardness of the pressure roller 110 is, the broader the fixing nip that can be obtained with low pressure is, but if too low, durability deteriorates. In the present embodiment, this was set to 40° on the Asker-C hardness scale (600 g weight). The pressure roller 110 rotates at a surface travel speed of 140 mm/sec under the drive source.

The heating heater 113 of the present embodiment is a general-type heater used in film-heating type heading devices, and an article is used in which resistance heating elements are serially arrayed on a ceramic substrate. The heating heater 113 used was fabricated by coating resistance heating elements of silver/palladium (Ag/Pd) by screen printing to a height of 10 μm on a surface of an alumina substrate 6 mm wide and 1 mm thick, which was then covered by glass to a thickness of 50 μm as a heating element protective layer.

As illustrated in FIGS. 3A and 3B, a temperature sensing element 115 for sensing temperature of the ceramic substrate is disposed on a rear face of the heating heater 113. The temperature of the heating heater 113 is adjusted by appropriately controlling electric current to be applied to the resistance heating elements, in accordance with signals from this temperature sensing element 115. When the temperature is high, electric power consumption is great, and accordingly the temperature needs to be set to an appropriate level. In the present embodiment, the regulated temperature for plain paper was set to 180° C. Also, a temperature fuse (omitted from illustration), which is a safety element for interrupting the circuit and securing safety in a case in which the heating heater 113 exhibits abnormally high temperature, may be disposed on the rear face of the heating heater 113. The heating heater 113 is connected to the power supply via the temperature fuse. When the temperature fuse is subjected to an abnormally high temperature, the temperature fuse is blown, and power feed from the power supply to the heating heater 113 is interrupted. Note that the configuration of the fixing apparatus 14 is not limited to this. For example, the fixing apparatus 14 may be made up of a heat roller having a halogen heater therein. The present embodiment is applicable as long as the driving source to be used for driving the fixing apparatus 14 and the developing apparatus 8 is in common.

Features of Present Embodiment: Sheet Passage Control

Sheet passage control, which is a feature of the present embodiment, will be described. When the recording material P enters a fixing nip portion N1, the toner image is heated and fixed onto the recording material P at the fixing nip portion N1. Thereafter, following a trailing end of the recording material P leaving the fixing nip portion N1, the motor stops. In the present embodiment, time from the trailing end of the recording material P leaving the fixing nip portion N1 until the motor stops is time for post-rotation operations. In the present embodiment, post-rotation operations are carried out while the recording material P is being transported from the fixing nip portion N1 to the tray 40. That is to say, the motor is driven over a predetermined amount of time, during post-rotation operations.

In the present embodiment, recording material P of which the width is a predetermined value or greater (200 mm or more here) will be referred to as "normal-sized sheet". Also, recording material P of which the width is smaller than that of normal-sized sheets (i.e., of which the width is smaller than the predetermined value, which is smaller than 200 mm here) will be referred to as "small-sized sheet". When using small-sized sheets, in a region of a sheet passage region of the nip portion where the small-sized sheets pass (hereinafter referred to as "first region"), heat is drawn away by the sheets. Conversely, in regions of the normal sheet region other than the region where the small-sized sheets pass (hereinafter referred to as "second region"), heat is not drawn away by the sheets. Accordingly, at the point in time following fixing, the temperature value of the second region is higher than in the first region. When fixing of toner images to normal-sized sheets is performed in a state in which such a temperature difference is occurring between the first region and the second region, high-temperature offset may occur, which is a phenomenon where an unfixed image borne by a normal-sized sheet is subjected to excessive heat supply in the second region out of the sheet passage region, and is transferred from the face of the normal-sized sheet onto the outer peripheral face of the fixing film.

Flow of Conventional Example

As a conventional example, there is a method for extending driving following post-rotation after passage of small-sized sheets, to do away with the difference in temperature between the first region and the second region. An operation flow of the conventional example will be described with reference to FIG. 4. In step S100, printing is started. In step S101, the control unit 200 determines whether the recording material P of which sheet passage has been performed is a small-sized sheet, on the basis of sensing results of a sheet width sensor 500. In a case in which determination is made that this is not a small-sized sheet (No in S101), the above-described post-rotation is performed in step S102, and in step S103 the printing ends. Conversely, in a case in which determination is made that this is a small-sized sheet (Yes in S101), post-rotation is performed in step S200, motor driving is performed for a predetermined amount of time in S201, and in step S103 the printing ends. In a case of small-sized sheets, driving of the motor in S201 is preferably performed only for an amount of time until the difference in temperature between the first region and the second region is done away with. In the example here, the motor driving time was set to 10 seconds.

However, in a configuration in which the driving source of the fixing apparatus 14 and the developing apparatus 8 is in common, and transmission of driving force cannot be stopped between the developing roller 4 and the driving source, the following problem occurs when following the operation flow of the conventional example such as described above. That is to say, the developing roller 4 continues to rotate even while the motor driving is extended following post-rotation due to small-sized sheets (period of S201), and accordingly the toner 3 is repeatedly rubbed at the photosensitive drum 1 and the developing blade 6, leading to deterioration of the toner 3 progressing. Now, in rotation of the developing roller 4 for image formation, the toner 3 is rubbed at the photosensitive drum 1 and the developing blade 6, but even so the toner 3 is used and consumed in image formation before toner deterioration progresses. Conversely, when the developing roller 4 rotates without consuming the toner 3, as in extended post-rotation due to small-sized sheets, deterioration of toner 3 is promoted.

Flow of Present Embodiment

Figure 4:
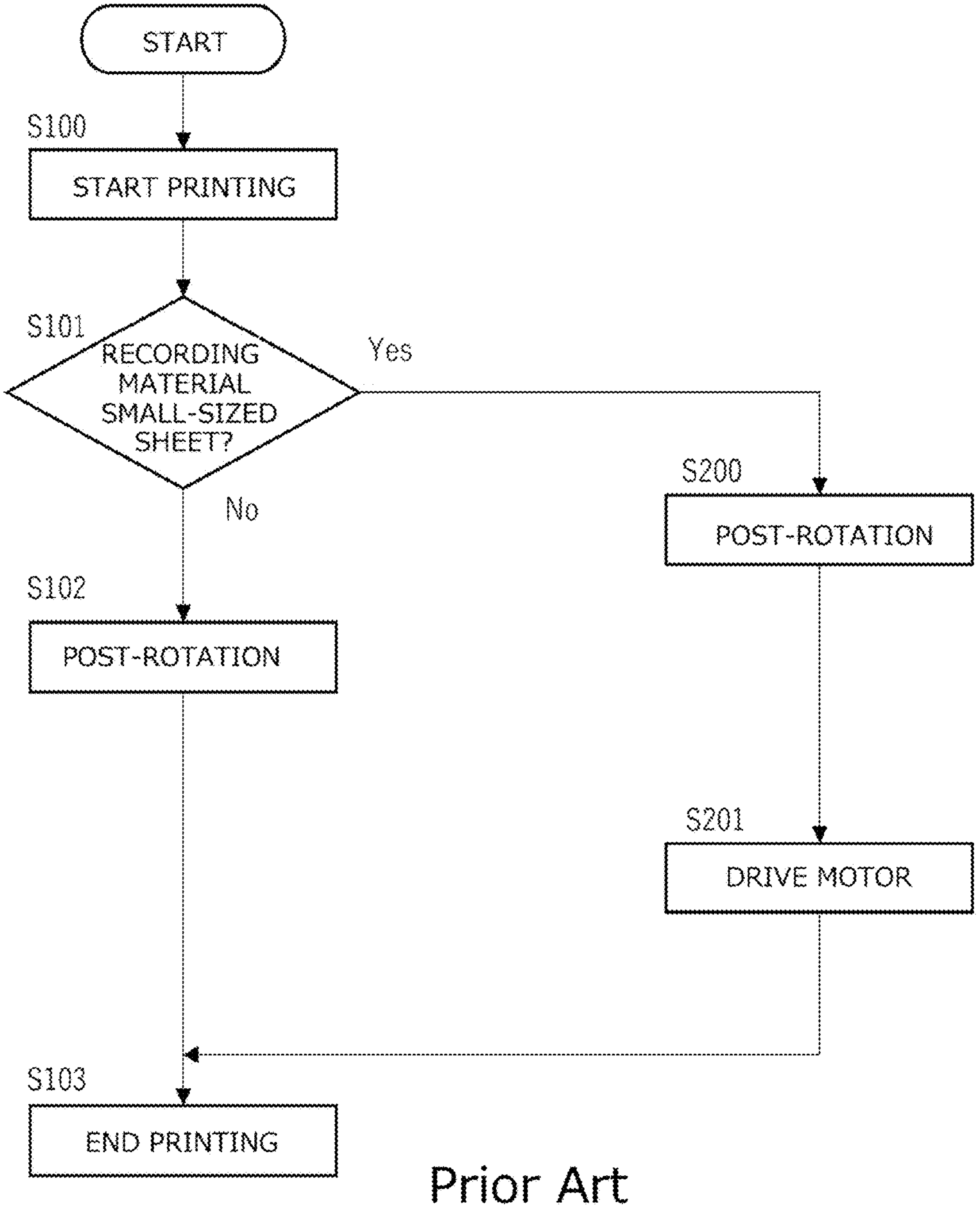
FIG. 4 is a schematic diagram showing a sheet-passage sequence according to a conventional example.

Accordingly, in the present embodiment, in order to suppress the temperature in the second region following post-rotation, an image forming job-stop time is provided, as a time for stopping execution of operations involving driving of at least the developing apparatus 8 (e.g., operations for rotating the developing roller 4 in order to develop an electrostatic latent image in a print job). During the image forming job-stop time, the image forming apparatus 100 is in an image forming job-stop state in which jobs involving driving of the developing roller 4 cannot be performed. Note that even during the image forming job-stop time, not all jobs relating to image forming are necessarily non-executable, and just portions of jobs that need operation of the driving source are non-executable. Accordingly, image processing that is performed in the background (e.g., loading processing of image data) is executable. Also, even during the image forming job-stop time, jobs for printing instructions and so forth from the user can be accepted and saved in an execution queue, and can be executed after image forming operations involving driving of the developing roller 4 become available. However, an arrangement may be made in which, during the image forming job-stop time, notification is made in response to jobs such as printing instructions and so forth from the user, to the effect that jobs cannot be accepted. Moreover, the developing roller 4 is not unavailable for driving over the entire period of the image forming job-stop time, and the developing roller 4 can also be driven at a timing of driving the motor again from the stopped state, for example, which will be described later. However, this driving again is performed temporarily, and is insufficient time-wise to execute image forming. In the present embodiment, an operation is performed in which driving is performed from a state in which the motor is stopped during the image forming job-stop time, and then returning to the stopped state. An operation flow of the present embodiment will be described with reference to FIG. 5. Processing that is the same as in the conventional example in FIG. 4 is denoted by the same signs, and description will be simplified.

Printing is started in step S100, and in step S101 determination is made regarding whether the recording material P is a small-sized sheet. In a case in which determination is made that this is not a small-sized sheet, post-rotation is performed in step S102 in the same way as with the conventional example, and in step S103 the printing ends.

Conversely, in a case in which determination is made in step S101 that this is a small-sized sheet, post-rotation is performed in step S200, and in step S210 the motor is stopped (first stopping). Next, in step S211, the motor is driven (first driving), and thereafter in step S212 the motor is stopped again (second stopping). Subsequently, in step S103 the printing ends. That is to say, stopping the motor stops rotation of the developing roller 4 as well in the developing apparatus 8, and accordingly deterioration of the toner 3 can be suppressed.

Figure 6A:
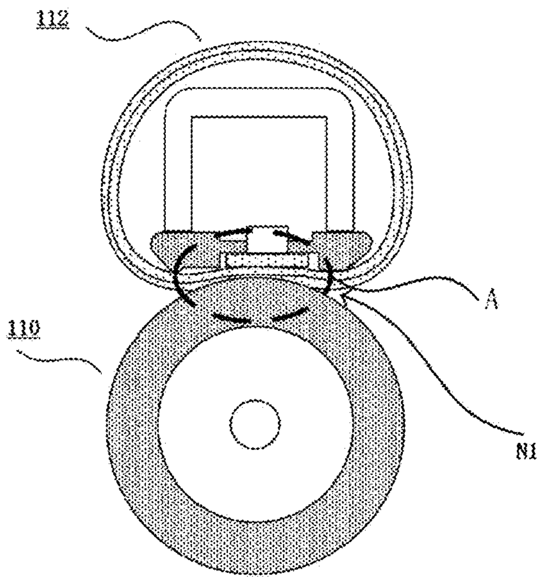
FIGS. 6A and 6B are schematic diagrams illustrating driving operations according to the first embodiment.
Figure 6B:
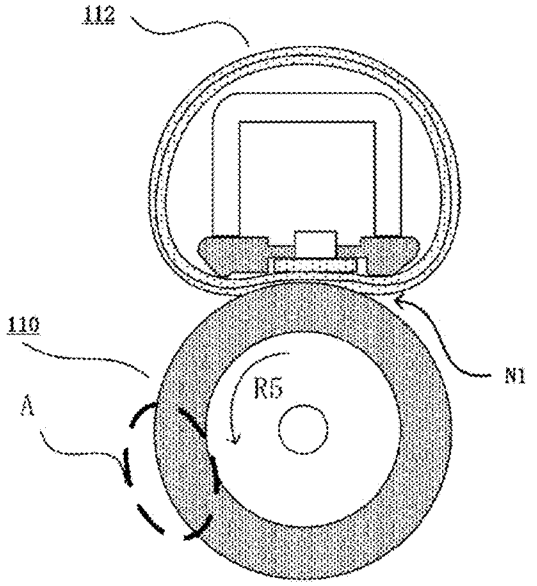

However, stopping the motor may have undesirable effects. That is to say, when the motor remains in a stopped state as illustrated in FIG. 6A, an area of a dashed line A including the fixing nip portion N1 does not come into contact with outside air, and does not readily cool. Accordingly, in the present flow, following stopping the motor, temporary driving operations (S211) are performed, following which the motor is stopped again (S212). Accordingly, the region of the dashed line A moves by rotating in an arrow R5 direction, and thus the heat of the fixing nip portion N1 can be moved to the outside of the nip, as illustrated in FIG. 6B. Also, the surface of the pressure roller that has been cooled by the outside air comes to the fixing nip portion N1, on the fixing film 112 side of the fixing nip portion N1 as well, and accordingly cooling can be efficiently performed.

Here, the motor stopping time in step S210 was set to 1 second. With regard to the driving time in S211, shifting the position of the region making up the fixing nip portion N1, while suppressing revolutions, is necessary. Accordingly, a driving time of a range in which a distance over which the region of the dashed line A moves is smaller than the outer diameters of the pressure roller and the fixing film is desirable. In the present embodiment, the driving time was set to 150 ms (driving distance of approximately 20 mm). The total time of steps S210, S211, and S212 was set to 12 seconds.

In the present embodiment, judgment of whether small-sized sheets or not is performed by the sheet width sensor 500 disposed near the transport roller 50. As for the sheet width sensor 500, a sensing member can be used that has two flags in a width direction intersecting (typically orthogonal to) a transport direction of the recording material P and that also has sensing units at which light from light-emitting units is shielded in a state in which the flags are raised and light is transmitted in a state in which the flags are down, for example. In such a sheet width sensor 500, when a sheet that is broader in sheet width than a distance between the flags is transported, the flags that are stricken by the sheet fall down, and in conjunction with this, the transmitted light is sensed. Accordingly, whether the sheet width is the predetermined distance or more, or smaller than the predetermined distance, can be determined. The sheet width sensor 500 according to the present embodiment has sheet-width sensor flags that are each set at positions 100 mm from the sheet center in the longitudinal direction, such that when recording material P that is 200 mm or more in width is transported, the sheet-width sensor flags fall, and sensing is made that the sheet is not a small-sized sheet. Judgement is made that the sheet is a small-sized sheet when neither sensor sense, or when only one thereof senses. Note that the sheet-width sensor does not have to be a system that uses flags. Also, whether small-sized sheets or not may be judged on the basis of printing settings of the image forming apparatus. It is sufficient as long as the width of the recording material is compared with a predetermined distance, and determination of a normal-sized sheet can be made if the width of the recording material is the predetermined distance or more, and determination of a small-sized sheet can be made if the width of the recording material is smaller than the predetermined distance.

Now, during a period from the motor stopping in step S210 until the printing ending in S103, the motor used for rotation of the fixing apparatus 14 and the developing roller 4 is stopped, and accordingly the image forming apparatus 100 is in a state of not being able to execute printing jobs. Accordingly, even if the user executes a printing instruction from a host PC, for example, image forming operations will not be started. Hence, the control unit 200 according to the present embodiment places the image forming apparatus in such an image forming job-stop state following post-rotation.

Figure 9A:
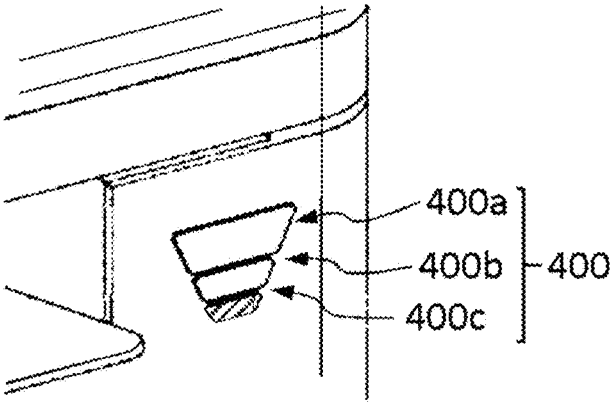
FIGS. 9A to 9C are diagrams illustrating an example of notification means according to the present invention.
Figure 9B:
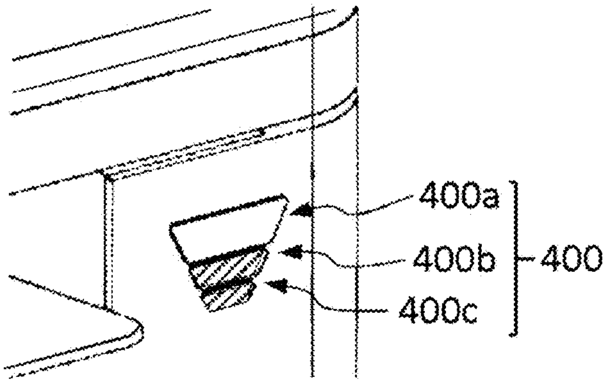
Figure 9C:
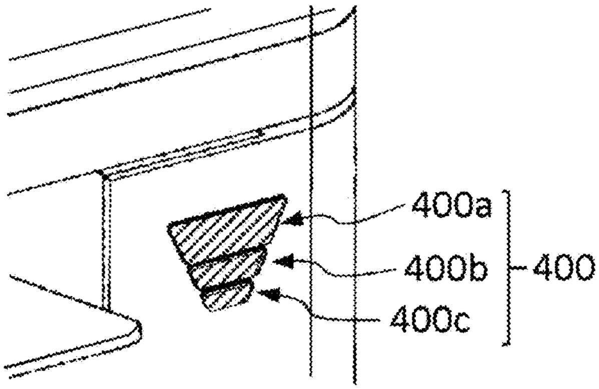

Also, in the image forming job-stop state, not only is the motor stopped for a long period of time, but even if the user performs a printing instruction from the host PC, no response is received from the image forming apparatus 100. Accordingly, the user may be notified during the image forming job-stop time that the image forming apparatus 100 is operating. Accordingly, the user can recognize that the image forming apparatus 100 is operating even though the motor is in a stopped state. It is sufficient for contents of notification to the user to be something that indicates that the image forming apparatus 100 is operating, and may be a message displayed on the operation panel 60, for example. Also, notifying means such as light-emitting diodes (LEDs) or the like are sometimes provided on the image forming apparatus 100. For example, FIGS. 9A to 9C illustrate the way in which indicators 400 (400*a* to 400*c*) for notifying the user of remaining toner amount are provided on the housing of the apparatus. FIG. 9A illustrates a low remaining amount (Low), FIG. 9B a moderate remaining amount (Mid), and FIG. 9C a full remaining amount (Full). In this case, the user may be notified of the job-stop state by the indicators 400 (400*a* to 400*c*) blinking on and off.

Effects of Present Invention

Sheet-passage durability testing was performed, and whether fogging images occurred was evaluated as image defects. Two-sheet passage was repeatedly carried out, and sheet passage of 5000 sheets was performed. For sheet passage, Canon Office 70 (grammage 70 g, A4 size), and PB Paper (grammage 64 g, A5 size) were used. Sheet passage was performed with Canon Office 70 that is a normal size, as a comparative example, sheet passage of PB Paper under conditions of the conventional example, and sheet passage of PB Paper under conditions of the present embodiment.

Images on the passed sheets were evaluated, and cases where fogging images occurred were marked by crosses, while cases where fogging images did not occur were marked by circles. Results are shown in FIG. 7.

There were no occurrences of defective images up to 5000 prints for the comparative example. Conversely, image defects of fogging occurred from 3500 prints and on with the conventional example. This is due to the number of developing revolutions increasing as a results of extending post-rotation that operates since small-sized sheets were passed, loading to increased number of times of rubbing of the toner 3, causing deterioration of the toner 3. With the present embodiment, there is no extended rotation of post-rotation even when small-sized sheets are passed, and accordingly there were no image defects of fogging occurring after 5000 prints, in the same way as with the conventional example.

Although the driving time following post-rotation in the conventional example, and the image forming job-stop time in the present embodiment have been described as fixed values, the difference temperature between the first region and the second region change in accordance with the number of sheets passed consecutively, and accordingly the driving time in the conventional example and the image forming job-stop time in the present embodiment are desirably set in accordance with the number of sheets passed.

As described above, in a configuration in which the driving source of the fixing apparatus 14 and the developing roller 4 is in common, and no developing roller drive disengaging mechanism is provided, to reduce size of the image forming apparatus, a period of time during which the next job cannot be accepted is provided in order to suppress temperature in the second region following post-rotation after sheet passage of small-sized sheets, driving from the stopped state of the motor is performed during this period of time, and then returned to the stopped state, whereby occurrence of fogging images can be suppressed while suppressing deterioration in productivity.

Also, in the present embodiment driving of the fixing apparatus 14 stops as well, and accordingly this suppresses shaving off of the release layer 128 due to wear, which occurs due to rotation of the fixing film 112. Accordingly, effects of extended lifetime of the fixing apparatus 14 can be anticipated.

Second Embodiment

Next, a second embodiment will be described. The configurations and operations of the image forming apparatus 100 are the same as those in the first embodiment.

Features of Present Embodiment

In the present embodiment, the following reduction in image forming job-stop time is performed, while suppressing image defects. A method in which the image forming apparatus 100 is capable of executing both the sheet passage sequence shown in FIG. 4 and the sheet passage sequence shown in FIG. 5, and switching is performed between these two sequences, will be described here. The driving time in step S201 in FIG. 4 is 10 seconds, the same as that in the first embodiment, and the time of S210, S211, and S212 in FIG. 5 was 12 seconds.

Figure 5:
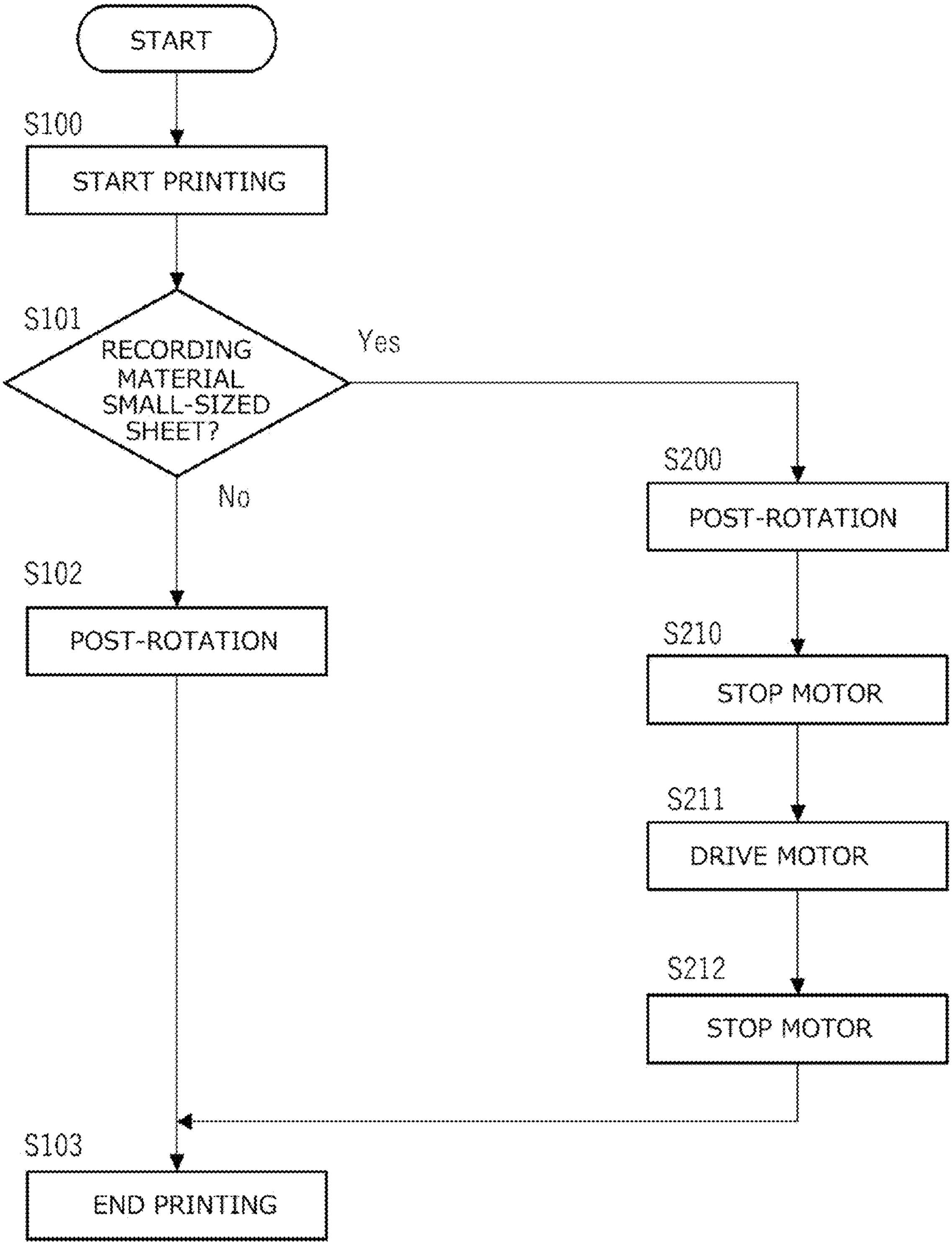
FIG. 5 is a schematic diagram showing a sheet-passage sequence according to a first embodiment.

Hereinafter, the mode shown in FIG. 4 will be referred to as "first mode", and the mode shown in FIG. 5 as "second mode". In the first mode shown in FIG. 4, the motor driving time following post-rotation is extended, and accordingly temperature rise of the fixing nip portion N1 is easy to suppress. Thus, this is a productivity-first mode in which the next printing job can be performed quickly. Conversely, in the second mode shown in FIG. 5, the motor is stopped following post-rotation, and accordingly this is a durability-first mode in which rubbing of the toner 3 by rotation of the developing roller 4 can be suppressed.

A switching method of the modes will be described. Here, the first mode is set in initial settings. The control unit 200 according to the present embodiment then records, in the ROM 203 serving as recording means, the results of sensing by the sheet width sensor 500 (sensing results of whether small-sized sheets or normal-sized sheets), each time that sheet passage is performed (each time that image forming operations are executed). Also, the control unit 200 calculates a proportion of normal-sized sheets and small-sized sheets using the CPU 201, each time that sheet passage is performed. When the proportion of small-sized sheets in the cumulative number of prints of recording material so far becomes no lower than a predetermined value (at least 40% here), the control unit 200 then switches to the second mode from the next job. Conversely, when the proportion of small-sized sheets falls below 40%, the control unit 200 switches to the first mode.

Note that while the predetermined value of the proportion for switching modes has been described here as being 40%, this is not restrictive. Also, once mode switching is performed, determination of switching may be stopped thereafter until a predetermined number of sheets of recording material P have passed, in order to keep mode switching from being frequently performed. Also, the calculation of proportion for mode switching may be reset at a predetermined timing (e.g., a case in which the apparatus has been restarted, a case in which no sheet passage has been performed for a predetermined period, a case in which maintenance such as cartridge replacement has been performed, and so forth)

Effects of Present Invention

Sheet-passage durability testing was performed in the same way as the first embodiment, by two-sheet passage being repeatedly carried out for 5000 sheets, and fogging images were evaluated, and driving extension time following post-rotation and image forming job-stop time were measured. The two types of Canon Office 70 (grammage 70 g, A4 size) and PB Paper (grammage 64 g, A5 size) were used as the sheets, and sheet passage was performed with various sheet passage proportions.

This was carried out under the conditions of the present embodiment, the conventional example, and the first embodiment as a second comparative example. For image evaluation, cases where fogging images occurred during sheet passage of 5000 prints were marked by crosses, while cases where fogging images did not occur were marked by circles. Image forming job-stop time was measured, and total time was calculated. Results are shown in FIG. 8.

With the conventional example, the image forming job-stop time was short, but when the sheet passage proportion of A5 sheets became 40% or more, the number of developing rotations increased and fogging images occurred. With the second comparative example, operations are stopped during the image forming job-stop time, and accordingly there was no occurrence of fogging images, but when the sheet passage proportion of A5 sheets is 20%, the image forming job-stop time is longer as compared to that of the conventional example. Conversely, with the present embodiment, there was no occurrence of fogging images, and the image forming job-stop time was also suppressed to a minimum.

This is because the image forming apparatus had the two modes of the conventional example and the first example, and the modes were automatically switched in accordance with the sheet passage proportion of normal-sized sheets and small-sized sheets. Also, while the present embodiment has the conventional example and the first embodiment modes, a mode in which the motor is stopped in S201 following post-rotation in S200 may be included instead of the first embodiment, as illustrated in FIGS. 9A to 9C. S201 here is the image forming job-stop time, and 15 seconds is necessary to avoid hot offset.

Also, while the image forming apparatus performs switching automatically in the present embodiment, an arrangement may be made in which notification of switching of the two modes is made to the user, and the user performs switching at the operation panel 60.

As described above, in a configuration in which the driving source of the fixing apparatus 14 and the developing roller 4 is in common, and no developing roller drive disengaging mechanism is provided, to reduce size of the image forming apparatus, two modes to be used following small-sized sheet passage are provided, and by switching the modes in accordance with notification of switching, occurrence of fogging images can be suppressed while suppressing deterioration in productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-140772, filed on Aug. 31, 2023, which is hereby incorporated by reference wherein in its entirety.

What is claimed is:

1. An image forming apparatus comprising:

a photosensitive drum on which an electrostatic latent image is formed on a surface thereof in accordance with image information;

a developing roller configured to supply toner to the photosensitive drum to develop the electrostatic latent image and form a toner image;

transfer unit configured to transfer the toner image onto a recording material;

a fixing unit configured to heat fix the toner image onto the recording material, the fixing unit including a pressure roller and a heating member that forms a fixing nip portion between the heating member and the pressure roller;

a driving source configured to transmit driving force to the developing roller and the pressure roller; and a control unit configured to:

determine whether the recording material is a normal-sized sheet where a width in an intersecting direction is at least a predetermined distance, or a small-sized sheet where the width is smaller than the predetermined distance;

execute, in a case in which the recording material is the normal-sized sheet, a first mode, in which a post-rotation operation is performed in which the driving source is driven for a predetermined amount of time following the recording material passing the fixing nip portion; and execute, in a case in which the recording material is the small-sized sheet, a second mode, in which:

the post-rotation operation is executed following the recording material passing the fixing nip portion; and after completing the post-rotation operation, the image forming apparatus enters an image forming job-stop state, in which an image forming operation is not executed, wherein, in the image forming job-stop state, a first stop of the driving source, a first drive of the driving source after the first stop, and a second stop of the driving source, after the first drive, are performed, and wherein, in the second mode, a post-rotation time period during which the driving source is driven in the post-rotation operation is longer than a first stop time period during which the driving source is stopped in the first stop, and the first stop time period is longer than a first drive time period during which the driving source is driven in the first drive.

2. The image forming apparatus according to claim 1, wherein, in the first drive, a region that is in contact with the fixing nip portion, when the post-rotation operation ends, is moved to a position of not being in contact with the fixing nip portion.

3. The image forming apparatus according to claim 2, wherein, in the first drive, a distance of movement of the region that is in contact with the fixing nip portion, when the post-rotation operation ends, is a smaller distance than an outer diameter of the pressure roller.

4. The image forming apparatus according to claim 1, wherein, during the image forming job-stop state, the control unit notifies a user that the image forming apparatus is currently operating.

5. The image forming apparatus according to claim 1, wherein the control unit:

records in a recording unit a result of determination of whether the recording material is the normal-sized sheet or the small-sized sheet;

calculates a proportion of the number of the small-sized sheets in a cumulative number of sheets of the recording material on the basis of the determination result obtained regarding a predetermined number of sheets of the recording material; and in a case in which the proportion is at least a predetermined value, switches an operating mode of the image forming apparatus to the second mode.

6. The image forming apparatus according to claim 1, wherein the control unit determines whether the first mode or the second mode operates on the basis of a user operation.

* * * * *